(12) United States Patent
Müller

(10) Patent No.: US 7,592,614 B2
(45) Date of Patent: Sep. 22, 2009

(54) METHOD AND APPARATUS FOR RECORDING AN IMAGE OF AN EDGE OF A MOVING OBJECT

(75) Inventor: Tobias Müller, Hirschberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 16 days.

(21) Appl. No.: 11/732,079

(22) Filed: Apr. 2, 2007

(65) Prior Publication Data

US 2007/0228307 A1    Oct. 4, 2007

(30) Foreign Application Priority Data

Mar. 31, 2006 (DE) .................. 10 2006 014 948

(51) Int. Cl.
*G01N 21/86* (2006.01)
(52) U.S. Cl. .................. 250/559.36; 250/224; 356/614; 356/638; 271/313; 271/265.03
(58) Field of Classification Search ............. 250/208.1, 250/559.04, 559.05, 559.07, 559.08, 559.12, 250/559.22, 559.59, 559.36, 221, 222.1, 250/223 R, 224, 559.03; 356/614, 625, 634–638; 271/3.13, 3.15, 3.17, 4.02, 4.03, 10.02, 10.03, 271/227, 258.01, 259, 261, 265.01, 265.02, 271/265.03
See application file for complete search history.

(56) References Cited

U.S. PATENT DOCUMENTS 5,006,719 A * 4/1991 Blaser ................ 250/559.36
5,013,927 A    5/1991 Tsikos et al.
5,453,825 A * 9/1995 Lipiz ...................... 399/16
5,859,440 A    1/1999 Acquaviva
6,297,491 B1 * 10/2001 Mangerson ............. 250/208.1
6,429,944 B1 * 8/2002 Flormann ................ 356/630
6,504,138 B1 * 1/2003 Mangerson ............. 250/208.1

FOREIGN PATENT DOCUMENTS

DE         198 42 192 A1    3/2000
DE    10 2005 007 993 A1    10/2005

* cited by examiner

*Primary Examiner*—Georgia Y Epps
*Assistant Examiner*—Kevin Wyatt
(74) *Attorney, Agent, or Firm*—Laurence A. Greenberg; Werner H. Stemer; Ralph E. Locher

(57) ABSTRACT

An image is recorded of the edge of a moving object, in particular a sheet, in a machine processing printing material. The illumination is carried out with an illuminating device, and an image is recorded of at least one part of the edge with an image recording device. The use of the illuminating device and/or the image recording device is substantially synchronous with the movement of the object and substantially parallel to the direction of movement of the object. A preferred illuminating device has a row or array of light sources which in each case are switched on and off synchronously with the movement of the object. The constant shadow or shadow strip produced by the illumination moves with the object and ensures adequate contrast between the brightly illuminated object and the dark background, so that the object can be segmented reliably, at least in the region of the edge, and its position, orientation and movement can be determined.

3 Claims, 7 Drawing Sheets

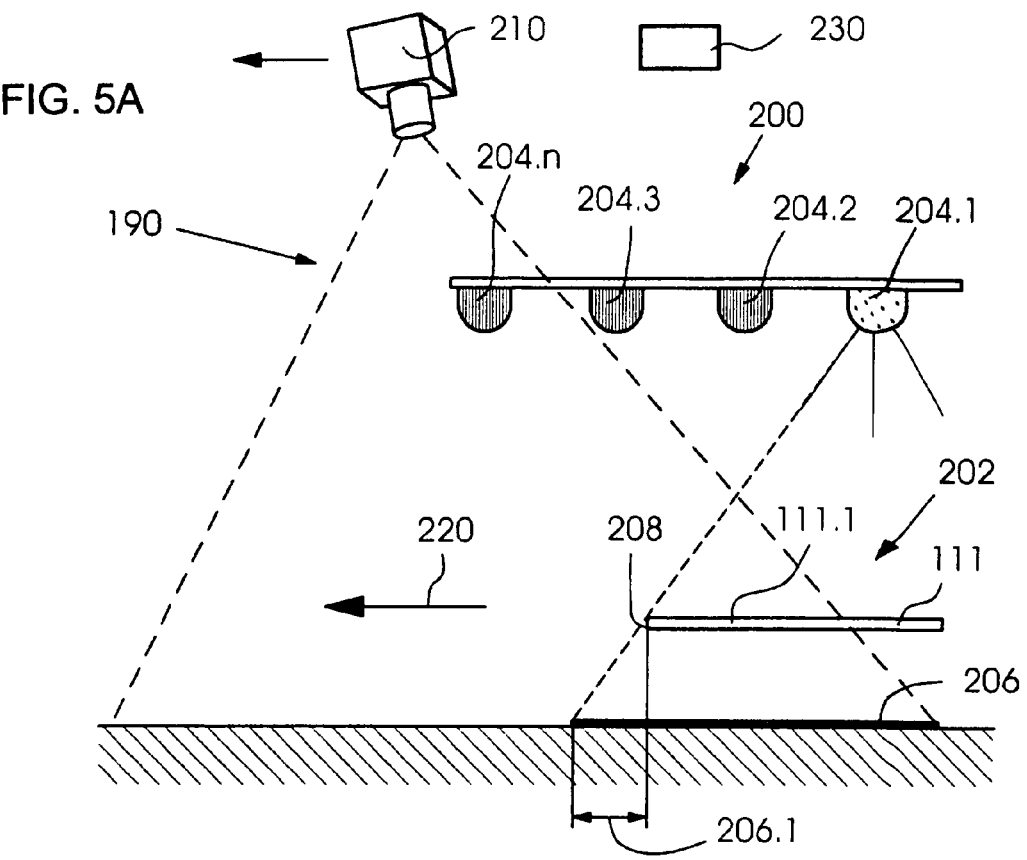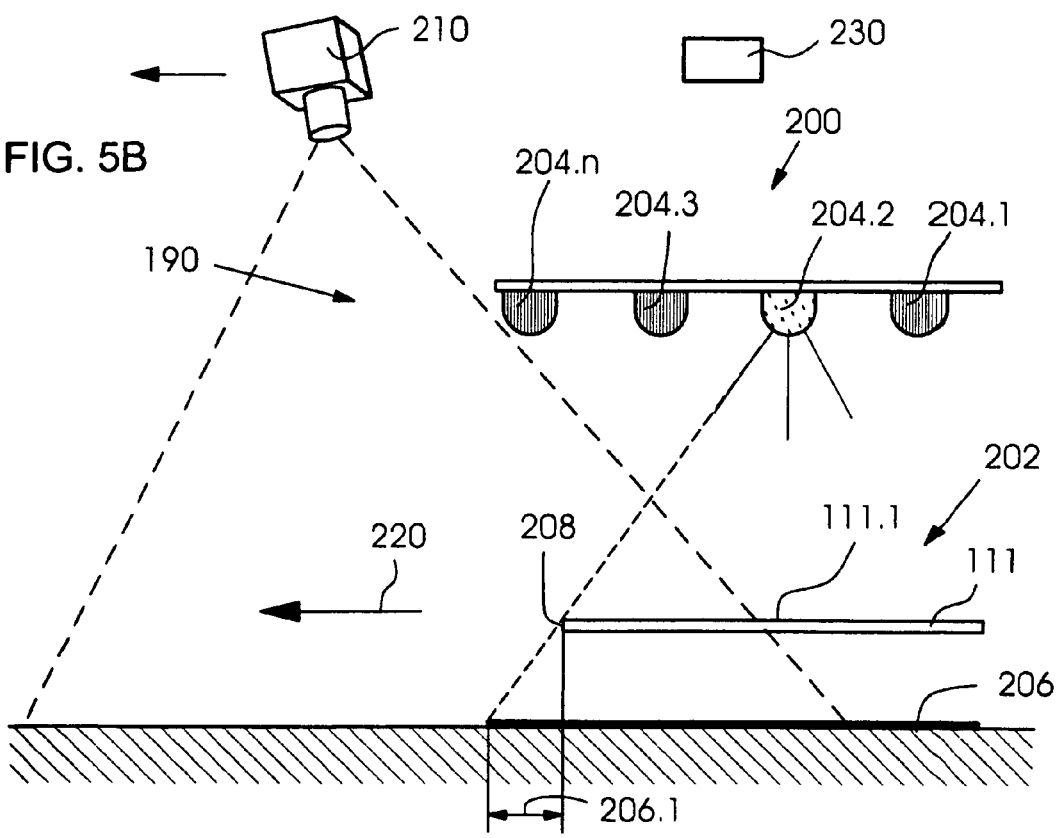

METHOD AND APPARATUS FOR RECORDING AN IMAGE OF AN EDGE OF A MOVING OBJECT

CROSS-REFERENCE TO RELATED APPLICATION

This application claims the priority, under 35 U.S.C. § 119, of German application DE 10 2006 014 948.3, filed Mar. 31, 2006; the prior application is herewith incorporated by reference in its entirety.

BACKGROUND OF THE INVENTION

Field of the Invention

The present invention relates to a method for recording an image of the edge of a moving object in machines processing printing material. The illumination is carried out by using an illuminating device, and an image is recorded of at least one section of the edge by using an image recording device. The invention also pertains to an apparatus for recording an image of the edge of a moving object with an illuminating device and an image recording device.

Methods and apparatus of this type are used, inter alia, for monitoring moving printing material sheets. They are used in particular in monitoring devices in machines processing printing material sheets, for example in lithographic offset printing presses the process paper or board sheets.

German published patent application DE 198 42 192 A1 describes a device for monitoring the sheet run. There, a periodicity of a light-shadow profile caused by sheet edges following one another is evaluated. A light source is arranged above the sheet which illuminates the sheet surfaces in such a way that each sheet edge causes a dark strip. In order to intensify the contrast of the light-shadow profile, it is proposed to provide the sheet edges with fluorescent substances. In order to produce defined light-shadow profiles, a plurality of illuminating devices arranged in different positions can be provided, it being possible for the region illuminated in this way to be imaged by a plurality of image recording devices. However, the manner in which the light source(s) is/are driven or the arrangement of a plurality of light sources is not described.

German published patent application DE 101 49 096 A1 describes an apparatus for registering the position of an edge of a sheet running parallel to the conveying direction. The apparatus, constructed as an optoelectronic measuring device, is arranged transversely with respect to the conveying direction and comprises an illuminating device and a receiver. The position of the edge of a sheet is imaged as a light/dark difference under illumination. In order to intensify the contrast, it is proposed to use colored light from three rows of LEDs, which are driven in such a way that an optimal light/dark difference is obtained. However, edge detection of edges running perpendicular to the conveying direction is not described. The timed driving of the LEDs is not described either.

SUMMARY OF THE INVENTION

It is an object of the present invention to provide a method which is improved as compared with the prior art and which overcomes at least one of the indicated disadvantages of the prior art.

It is a further or alternative object of the present invention to provide a method which is improved as compared with the prior art and which permits reliable monitoring of the moving object.

It is a further or alternative object of the present invention to provide a method which is improved as compared with the prior art and which permits reliable segmentation of the moving object from the background and reliable determination of the position, the orientation and/or the movement of at least one edge of the object.

It is an object of the present invention to provide an apparatus which is improved as compared with the prior art and which overcomes at least one of the indicated disadvantages of the prior art.

It is a further or alternative object of the present invention to provide an apparatus which is improved as compared with the prior art and which permits reliable monitoring of the moving object.

It is a further or alternative object of the present invention to provide an apparatus which is improved as compared with the prior art and which permits reliable segmentation of the moving object from the background and reliable determination of the position, the orientation and/or the movement of at least one edge of the object.

With the above and other objects in view there is provided, in accordance with the invention, a method for recording an image of an edge of a moving object in machines processing printing material, the method which comprises:

illuminating with an illuminating device; and recording an image of at least one section of the edge with an image recording device; and illuminating with the illuminating device and/or recording with the image recording device substantially synchronously with a movement of the moving object and substantially parallel to a direction of movement of the moving object.

In other words, the method according to the invention for recording an image of the edge of a moving object in machines processing printing material, illumination being carried out by using an illuminating device, and an image being recorded of at least one section of the edge by using an image recording device, is distinguished by the fact that the use of the illuminating device and/or the image recording device is carried out substantially synchronously with the movement of the object and substantially parallel to the direction of movement of the object.

On account of the use of the illuminating device and/or the image recording device synchronously with the movement of the object and substantially parallel to the direction of movement of the object, the method according to the invention advantageously permits reliable monitoring of the moving object, in particular reliable segmentation of the moving object from the background and reliable determination of the position, the orientation and/or of the movement of at least one edge of the object.

An advantageous and therefore preferred development of the method according to the invention can be distinguished by the fact that the illuminating device and/or the image recording device are activated substantially synchronously with the movement of the object and substantially parallel to the direction of movement of the object.

A further advantageous and therefore preferred development of the method according to the invention can be distinguished by the fact that the illuminating device comprises a row of light sources which, individually or in groups, are switched on and off substantially synchronously with the movement of the object and substantially parallel to the direction of movement of the object.

A further advantageous and therefore preferred development of the method according to the invention can be distinguished by the fact that the illuminating device and/or the image recording device are moved substantially synchronously with the movement of the object and substantially parallel to the direction of movement of the object.

A further advantageous and therefore preferred development of the method according to the invention can be distinguished by the fact that the illuminating device illuminates the object in such a way that the object throws a concomitantly moved shadow of substantially constant size.

With the above and other objects in view there is also provided, in accordance with the invention, an apparatus for recording an image of an edge of an object moving in a machine for processing printing material. The apparatus comprises:

an illuminating device disposed to illuminate the object;

an image recording device; and a control unit connected to and controlling at least one of said illuminating device and said image recording device, said control unit controlling said illuminating device and/or said image recording device substantially synchronously with a movement of the object and substantially parallel to a direction of movement of the object.

In other words, the apparatus according to the invention for recording an image of the edge of a moving object in machines processing printing material, having an illuminating device and an image recording device, is distinguished by the fact that a control unit is provided which controls the use of the illuminating device and/or the image recording device substantially synchronously with the movement of the object and substantially parallel to the direction of movement of the object.

When the apparatus according to the invention is used, the same advantages result as have already been described above with reference to the method according to the invention.

An advantageous and therefore preferred development of the apparatus according to the invention can be distinguished by the fact that the illuminating device and/or the image recording device are arranged such that they can be moved substantially synchronously with the movement of the object and substantially parallel to the direction of movement of the object.

A further advantageous and therefore preferred development of the apparatus according to the invention can be distinguished by the fact that the illuminating device and/or the image recording device are arranged such that they can be moved substantially synchronously with the movement of the object and substantially parallel to the direction of movement of the object.

A further advantageous and therefore preferred development of the apparatus according to the invention can be distinguished by the fact that the illuminating device comprises a row of n light sources oriented substantially parallel to the direction of movement of the object.

A further advantageous and therefore preferred development of the apparatus according to the invention can be distinguished by the fact that the illuminating device comprises an array of n times m light sources oriented substantially parallel and perpendicular to the direction of movement of the object.

The scope of the invention can also be seen to include a machine processing printing material, in particular a printing press or sheet-processing rotary printing press for lithographic offset printing, which is distinguished by at least one apparatus as described above in relation to the invention.

The machine processing printing material is preferably a sheet-processing rotary printing press for lithographic offset printing, in particular wet offset printing. The printing material can be board, film or preferably paper. The printing press can be operated in recto printing or preferably in recto and verso printing. The printing press can provide the printing material with single-color or preferably multicolor printed images. In the printing material transport direction, the printing press can comprise a feeder, a feed table, a plurality of printing units, a turning device, further printing units, a varnishing unit, a dryer, a powdering device and/or a delivery. The printing press can comprise an operating desk and a control unit.

Other features which are considered as characteristic for the invention are set forth in the appended claims.

Although the invention is illustrated and described herein as embodied in method and apparatus for recording an image of the edge of a moving object, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 5A-5B show a schematic view of a further preferred exemplary embodiment of an apparatus according to the invention.

In the drawings, mutually corresponding elements are provided with the same designations in each case.

DESCRIPTION OF THE PREFERRED EMBODIMENTS

Figure 1:
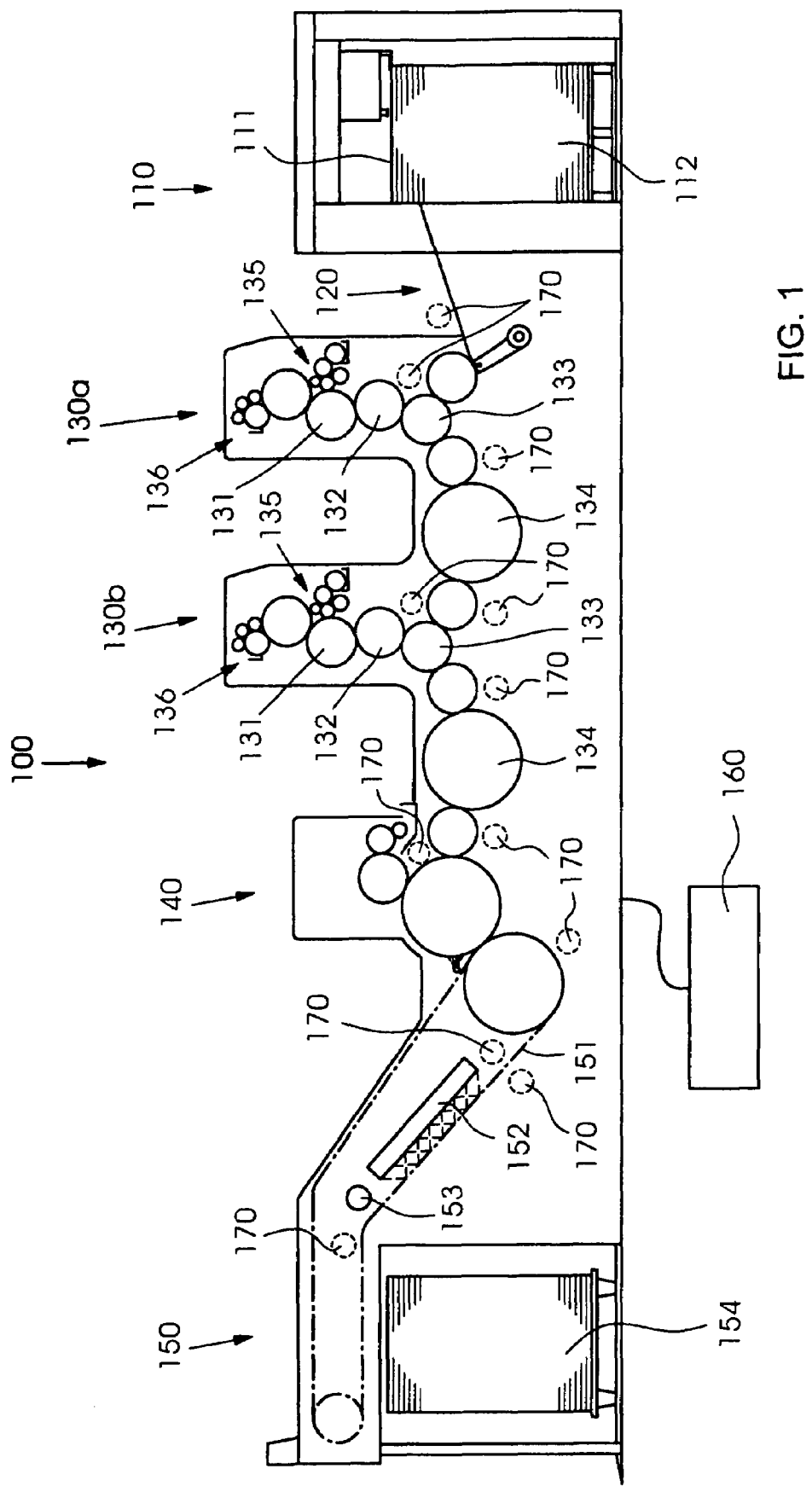
FIG. 1 is a diagrammatic side elevation of a sheet-fed rotary printing press according to the invention.

Referring now to the figures of the drawing in detail and first, particularly, to FIG. 1 thereof, there is shown a sheet-fed rotary printing press 100 according to the invention for lithographic offset printing. In the sheet transport direction (from right to left in the figure), the printing press 100 has a sheet feeder 110, a feed table 120, a plurality of printing units, for example two printing units 130a and 130b (or, for example, four, six or eight printing units), a varnishing unit 140 and a sheet delivery 150. The printing material sheets 111 are removed from a feed stack 112 in the feeder 110, are fed over the feed table 120 as an overlapping stream and individually to the first printing unit 130a. The printing units 130a and 130b each comprise a printing form cylinder 131, a transfer cylinder 132 and an impression cylinder 103, and also an inking unit 135 and a damping unit 136. Between the printing units 130a and 130b there is arranged at least one transfer cylinder 134, which can also be designed as a turner cylinder.

From the last printing unit 130b, the sheets are transferred to a conveying device 151 of the delivery 150. The sheets are conveyed past a dryer 152 for the purpose of drying and past a powdering device 153 to be powdered and are deposited on a delivery stack 154 of the delivery 150. The printing press 100 is controlled by a control unit 160.

In FIG. 1, the designation 170 illustrates positions in the region of the printing material run in which an apparatus 190 according to the invention can preferably be arranged.

Figure 2A:
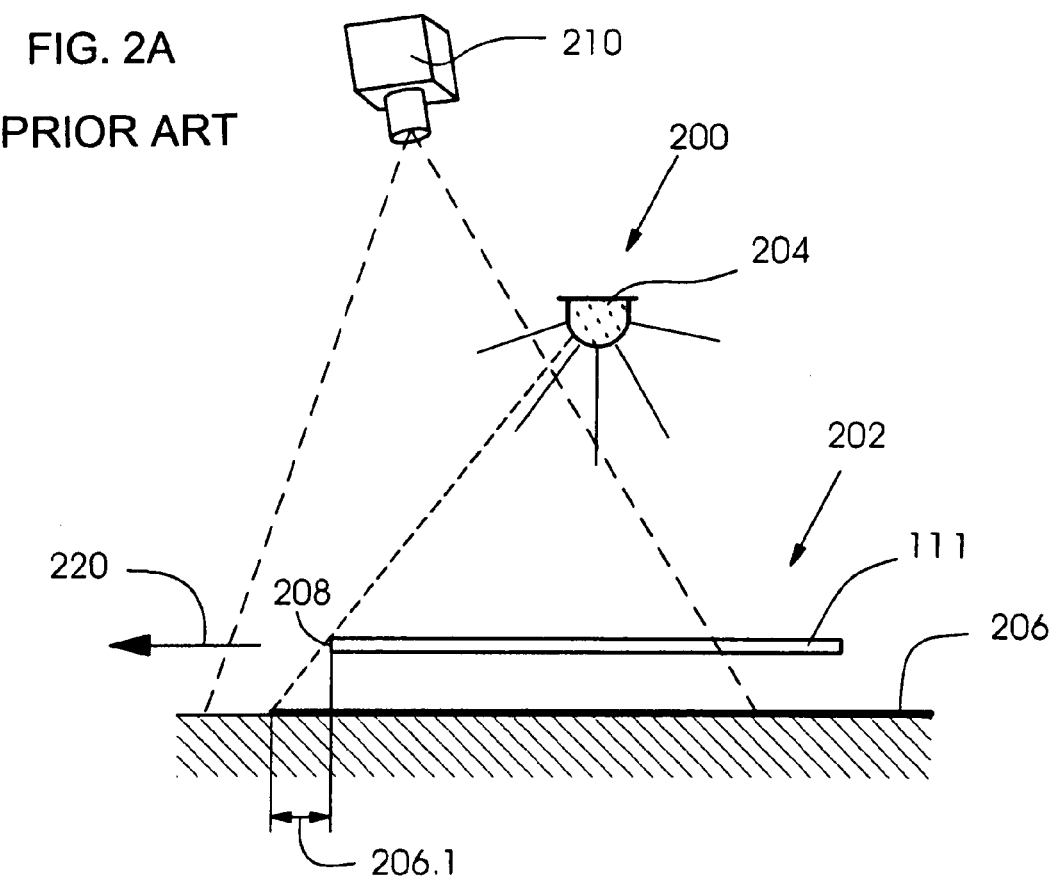
FIGS. 2A-2B are schematic views of an apparatus according to the prior art.

FIG. 2A illustrates a view of an apparatus according to the prior art, a printing material sheet 111 (also designated a sheet below) being illuminated by an illuminating device 200, which is arranged above the transport path 202 of the sheet 111. The illuminating device 200 includes a light source 204. The illumination by the light source 204 produces a shadow 206 under the sheet 111 as a result of at least partial shadowing. Likewise arranged above the sheet 111 is an image recording device 210, which records the illuminated sheet 111 and the shadow 206 produced by shadowing. Since the image recorded has a very good, that is to say intense, contrast between the light sheet 111 and the dark shadow 206, an edge 208, in particular the leading edge or trailing edge, of the sheet 111 can be determined with known measures for electronic image processing.

Figure 2B:
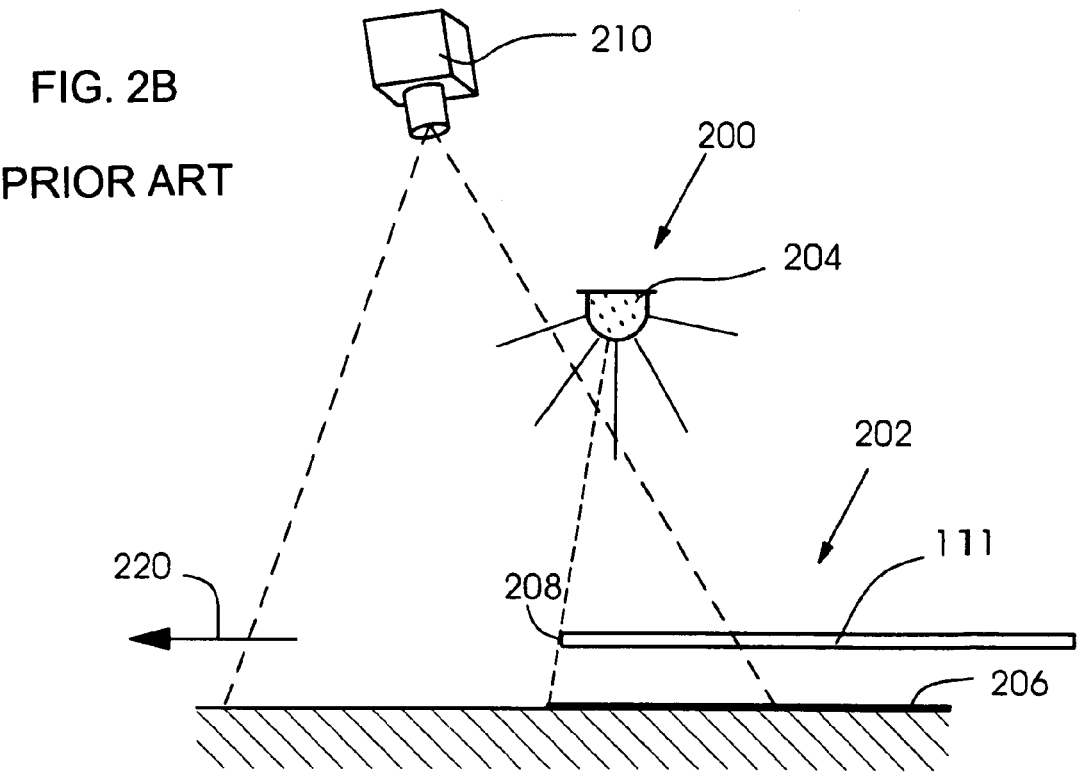

As can be seen from a comparison of the two FIGS. 2A and 2B, the size of the shadow 206 or the shadow strip 206.1 recorded by the image recording device 210 changes during the movement of the sheet 111 in the transport direction 220. This effect can lead to problems in the determination of the position and movement of the edge 208 of the sheet 111 since, in specific positions of the sheet 111, no shadow strip or only a very narrow shadow strip 206.1 will be recorded.

FIGS. 3A-3D show a view of a preferred exemplary embodiment of an apparatus 190 according to the invention having a substantially fixed illuminating device 200 and a substantially fixed image recording device 210, which overcomes these problems. The illuminating device 200 has a row of light sources 204.1 to 204.n, which are arranged to follow one another in the transport direction 220 and can be driven, i.e. switched on and off, individually or in groups. The light sources 204.1 to 204.n can in each case comprise a row m of light sources arranged beside one another perpendicular to the transport direction 220. Consequently, the illuminating device 200 can have an array of n times m light sources (n and m being natural numbers, with n≧2 and m≧1).

The illuminating device 200 is arranged adjacent to—preferably above—the transport path 202 of the sheet 111. The light sources 204.1 to 204.n are preferably formed as semiconductor light sources (photodiodes or LEDs). The image recording device 210 is preferably formed as a CCD or CMOS camera. Both the light sources 204.1 to 204.n and the image recording device 210 can be operated continuously or in a clocked manner in their respective active phase, that is to say in the phase of operation.

Figure 3A:
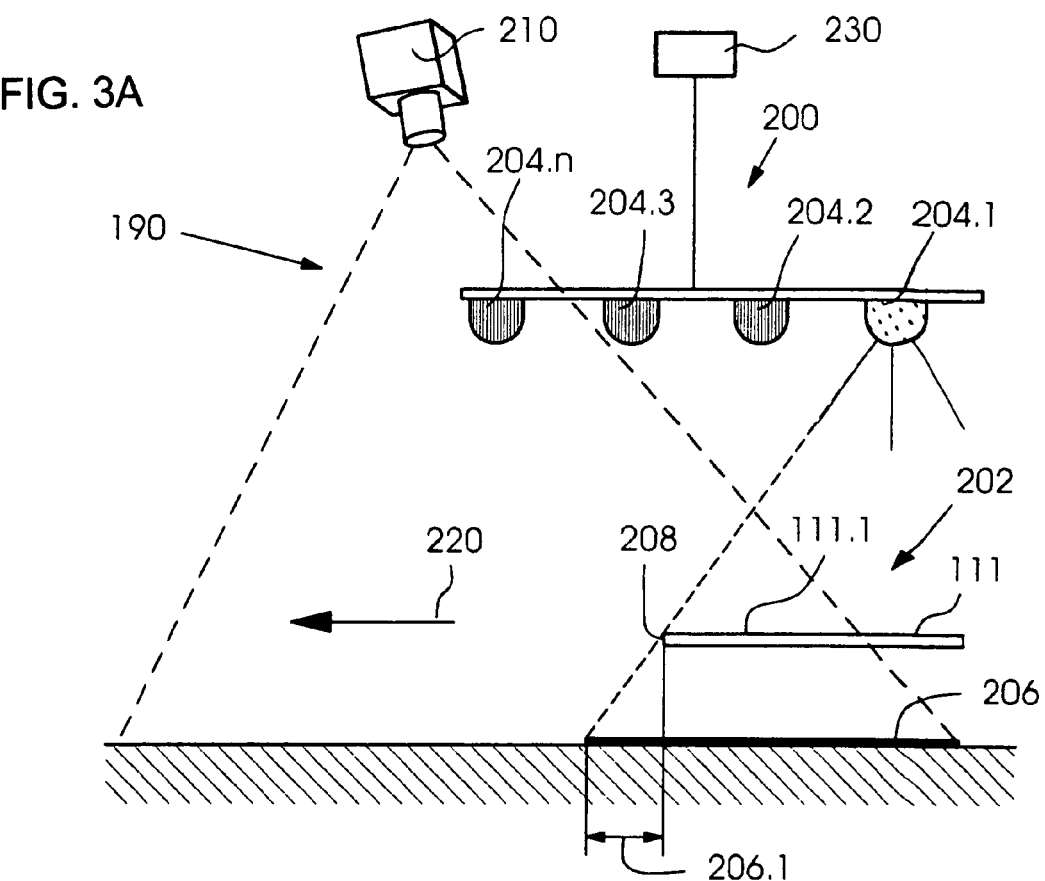
FIGS. 3A-3D show a schematic view of a preferred exemplary embodiment of an apparatus according to the invention.

In FIG. 3A, the light source 204.1 is activated and produces a shadow 206 under the sheet 111 in such a way that the image recording device 210 records both the brightly illuminated surface 111.1 of the sheet 111 and a dark shadow strip 206.1. On account of the intense contrast between surface 111.1 and shadow strip 206.1, by using known measures for electronic image processing, the sheet 111 can easily be segmented from the background (at least in the region of its leading edge or trailing edge) and the position, the alignment and/or the movement of the edge 208 of the sheet 111 can be determined.

Figure 3B:
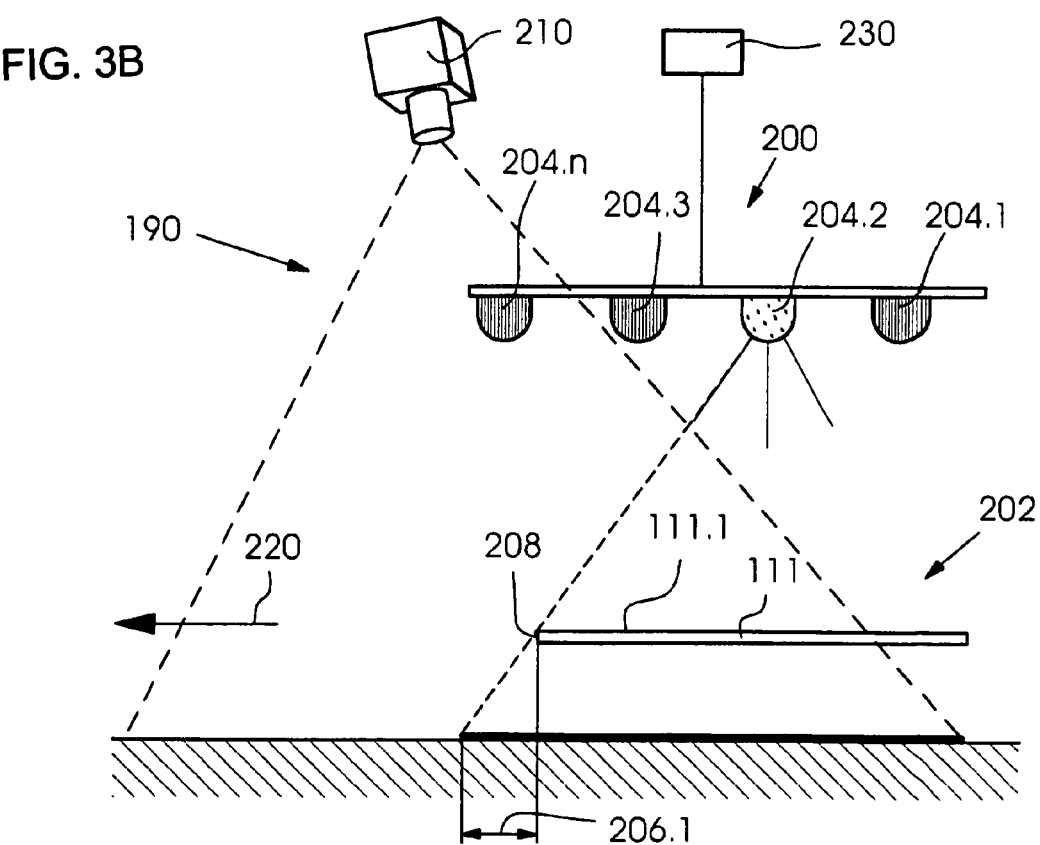

In FIG. 3B, the position of the sheet 111 has changed with respect to the position in FIG. 3A because of the sheet transport. The light source 204.1 has been deactivated and the light source 204.2 activated, so that the shadow strip 206.1 has substantially the same size (in particular extent in the transport direction 220) as the shadow strip 206.1 in FIG. 3A. The light sources 204.1 to 204.n are driven by a control unit 230, which is supplied with information about the transport speed of the sheet 111 or its movement sequence and manages the activation and deactivation of the light sources 204.1 to 204.n in a manner matched to this transport speed. Advantageously, the image recording device 210 is once more able to record a contrasting image of the bright surface 111.1 and the dark shadow strip 206.1 and make it available to electronic evaluation. The substantially constant shadow strip 206.1 is consequently moved concomitantly with the sheet 111.

Figure 3C:
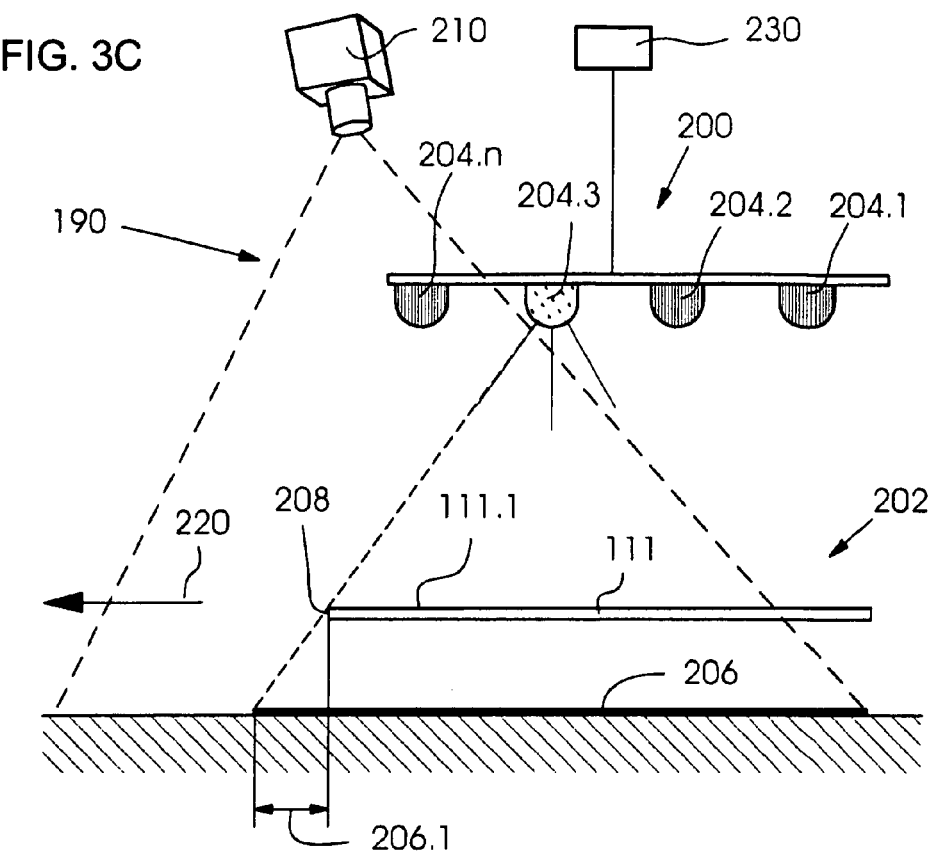
Figure 3D:
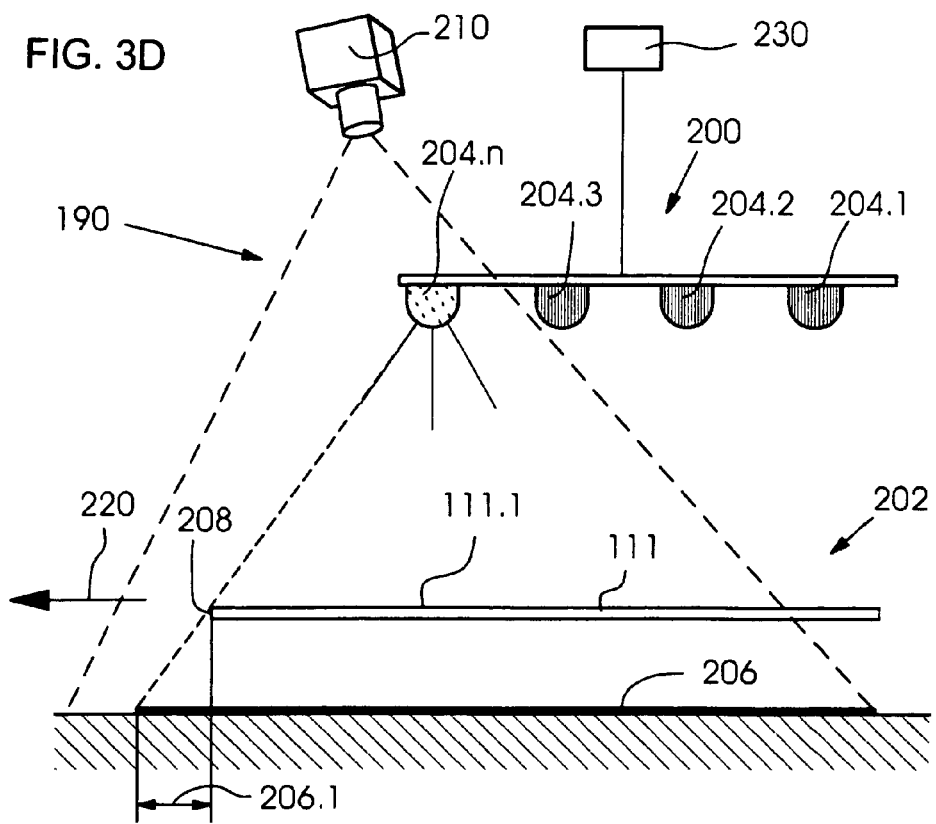

FIGS. 3C and 3D show that the activation and deactivation of the further light sources 204.3 to 204.n is likewise carried out substantially synchronously, for example in a pulsed or clocked manner, with the movement of the sheet 111 and substantially parallel to the direction of movement or transport direction 220 of the sheet 111. The shadow strip 206.1 is of substantially the same size or extent in all the phases of the movement of the sheet 111.

Figure 4A:
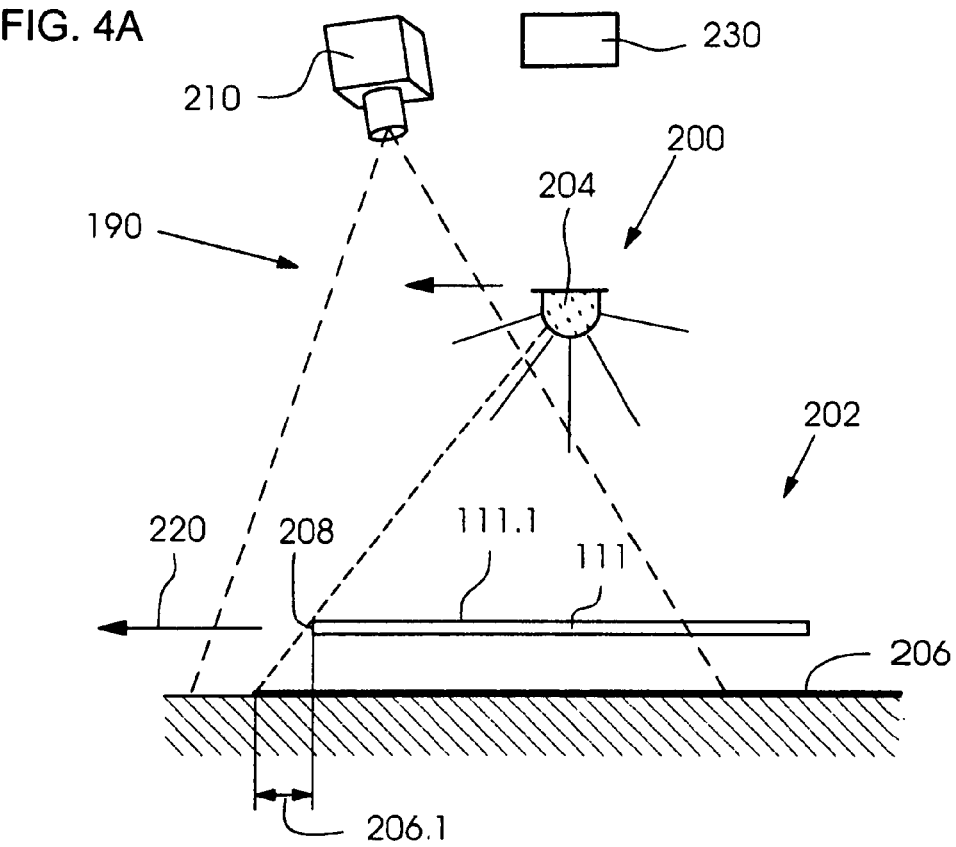
FIGS. 4A-4B show a schematic view of a further preferred exemplary embodiment of an apparatus according to the invention.
Figure 4B:
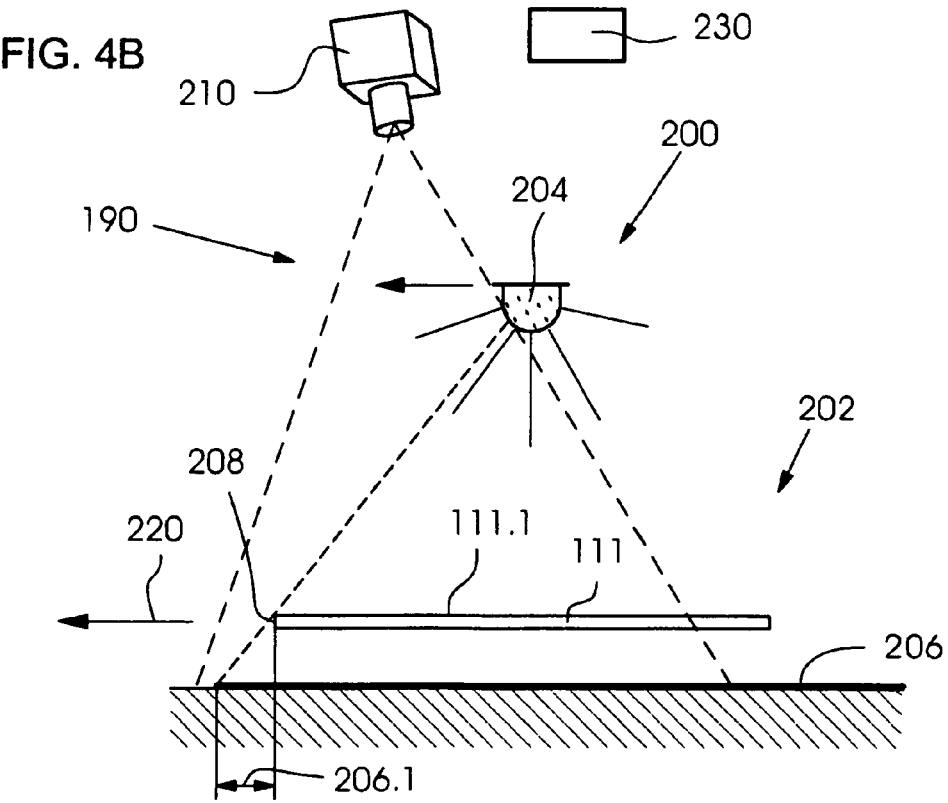

As an alternative to driving the light sources 204.1 to 204.n synchronously, a light source (or a row of m light sources) concomitantly moved substantially synchronously with the sheet 111 can also be provided. Such an exemplary embodiment is shown in FIGS. 4A and 4B. The light source 204 is arranged such that it can be moved and is moved, preferably displaced linearly, substantially synchronously with the movement 220 of the sheet 111 by a drive driven by the control unit 230. In this way, a shadow strip 206.1 that is substantially constant and moved concomitantly with the sheet 111 is likewise produced. Furthermore, a fixed light source 204 in conjunction with a concomitantly moved mirror is also possible.

Furthermore, as an alternative or in addition, an image recording device 210 concomitantly moved substantially synchronously with the sheet 111 can also be provided in order to record constant shadows. Such an exemplary embodiment is shown in FIGS. 5A and 5B. The image recording device 210 is arranged such that it can be moved and is moved, preferably displaced linearly, substantially synchronously with the movement of the sheet 111 by a drive driven by the control unit 230. As a result of the interaction of a synchronously activated or moved illuminating device 200 and a synchronously moved image recording device 210, the image recording situation and the illumination during the sheet transport are substantially always the same and therefore substantially lead to always equally good results of the evaluation.

Furthermore, as an alternative, the background, for example a sheet guiding surface, can be illuminated brightly and the foreground, that is to say the sheet 111, can be dark. In all the exemplary embodiments, it is important that sufficient contrast is produced between moving sheet 111 and background, which permits reliable segmentation of the sheet 111 from the background on account of reliable edge detection.

By using an apparatus 190 according to the invention and a method according to the invention, any desired moving objects can be registered. For instance, mention is made of moving printing material sheets 111, moving surfaces, moving grippers for printing material sheets or rotating cylinder channels and their respective edges perpendicular to the transport direction.

Figure 6:
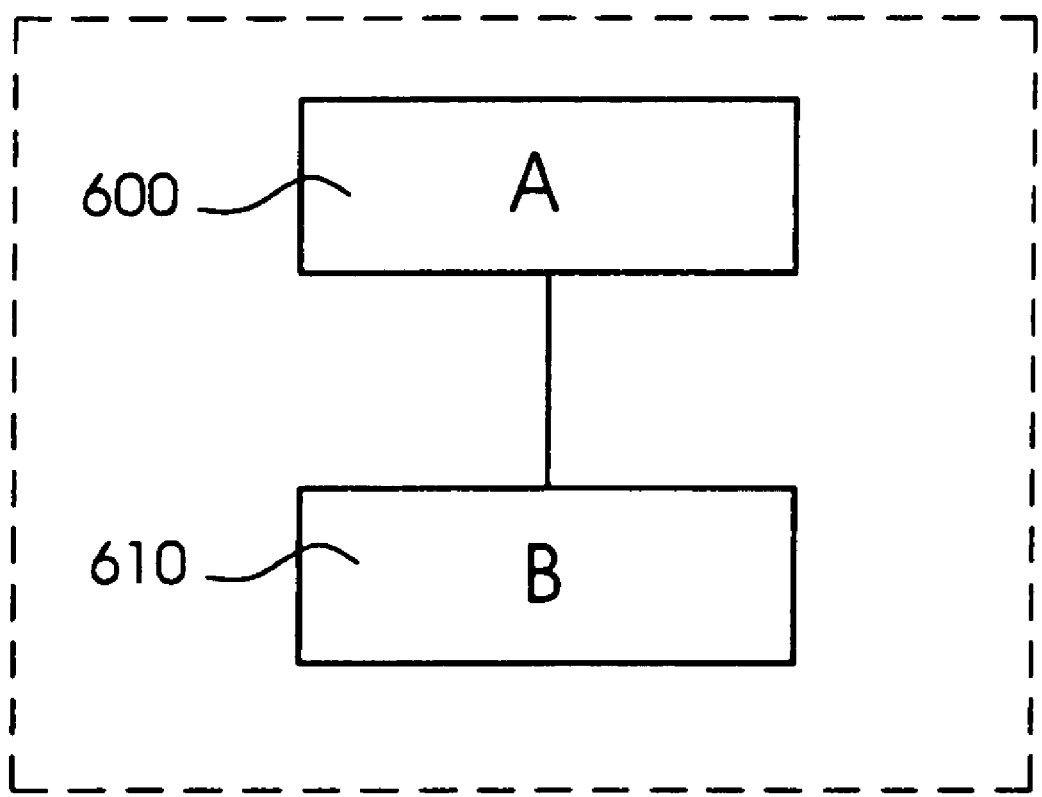
FIG. 6 is a flow chart illustrating a preferred exemplary embodiment of a method according to the invention.

In the following text, a preferred embodiment of the method according to the invention will be described by using the flow chart illustrated in FIG. 6.

A) Illumination (method step 600): The edge of a moving object 111, in particular of a sheet, in a machine processing printing material is illuminated by using an illuminating device 200.

B) Recording an image or a plurality of images (method step 610): The edge 208, in particular at least one section of the edge, of the moving object 111 is recorded by using an image recording device 210 and known measures for electronic image processing.

The illumination A and the recording of an image or a plurality of images B is carried out, according to the invention, in such a way that the use, in particular the activation, for example the switching on and off, and/or the movement of the illuminating device 200 and/or of the image recording device 210 is carried out substantially synchronously with the movement 220 of the object 111 and substantially parallel to the direction of movement 220 of the object 111. The illuminating device 200 illuminates the object 111 in such a way that the object 111 throws a concomitantly moved shadow 206 or a concomitantly moved shadow strip 206.1 of substantially constant size.

In this case, the illuminating device 200 preferably has a row of n light sources 204.1 to 204.$n$, which are switched on and off, individually or in groups, substantially synchronously with the movement 220 of the object 111 and substantially parallel to the direction of movement 220 of the object 111.

Since the recording of a plurality of images of the object 111 and of the shadow 206 or the shadow strip 206.1 is carried out in a very short time, the change in the image recording situation resulting from the relative movement of the object 111 in relation to the image recording device 210 can be disregarded in the case of synchronously activated light sources 204.1 to 204.$n$ or in the case of a concomitantly moved light source 204.

I claim:

1. A method for recording an image of an edge of a moving object in machines processing printing material, the method which comprises:
    illuminating with an illuminating device;
    recording an image of at least one section of the edge with an image recording device;
    illuminating with the illuminating device and/or recording with the image recording device substantially synchronously with a movement of the moving object and substantially parallel to a direction of movement of the moving object; and
    moving the illuminating device and/or the image recording device substantially synchronously with the movement of the object and along a direction substantially parallel to the direction of movement of the object.

2. A method for recording an image of an edge of a moving object in machines processing printing material, the method which comprises:
    illuminating with an illuminating device;
    recording an image of at least one section of the edge with an image recording device;
    illuminating with the illuminating device and/or recording with the image recording device substantially synchronously with a movement of the moving object and substantially parallel to a direction of movement of the moving object; and
    illuminating the moving object with the illuminating device such that the moving object throws a concomitantly moving shadow of substantially constant size.

3. An apparatus for recording an image of an edge of an object moving in a machine for processing printing material, the apparatus comprising:
    an illuminating device disposed to illuminate the object;
    an image recording device;
    a control unit connected to and controlling at least one of said illuminating device and said image recording device, said control unit controlling said illuminating device and/or said image recording device substantially synchronously with a movement of the object and substantially parallel to a direction of movement of the object; and
    said illuminating device and/or said image recording device being displaceably mounted for movement substantially synchronously with the movement of the object and substantially parallel to the direction of movement of the object.

* * * * *